US008411716B2

(12) United States Patent
Jacob et al.

(10) Patent No.: US 8,411,716 B2
(45) Date of Patent: Apr. 2, 2013

(54) CIRCUIT ASSEMBLY FOR CONTROLLING AN OPTICAL SYSTEM TO GENERATE OPTICAL PULSES AND PULSE BURSTS

(75) Inventors: Michel Jacob, Québec (CA); Louis Desbiens, Saint-Augustin-de-Desmaures (CA); Marco Michele Sisto, Québec (CA)

(73) Assignee: Institut National D'Optique, Quebec, Quebec (CA)

( * ) Notice: Subject to any disclaimer, the term of this patent is extended or adjusted under 35 U.S.C. 154(b) by 276 days.

(21) Appl. No.: 13/014,476

(22) Filed: Jan. 26, 2011

(65) Prior Publication Data

US 2012/0187860 A1 Jul. 26, 2012

(51) Int. Cl.
*H01S 3/00* (2006.01)

(52) U.S. Cl. .............. 372/38.02; 372/25; 372/26

(58) Field of Classification Search ............ 372/25, 372/26, 38.02
See application file for complete search history.

(56) References Cited

U.S. PATENT DOCUMENTS

| | | | |
|---|---|---|---|
| 4,621,376 A * | 11/1986 | Nakamura et al. ............ 398/197 |
| 5,268,975 A | 12/1993 | Yoshitani et al. |
| 5,402,009 A | 3/1995 | Kiyota |
| 5,638,017 A | 6/1997 | Kim |
| 5,742,634 A | 4/1998 | Rieger et al. |
| 6,108,465 A | 8/2000 | Iida et al. |
| 6,345,062 B1 * | 2/2002 | Taguchi et al. ............ 372/38.01 |
| 6,501,775 B2 * | 12/2002 | Taguchi et al. ............ 372/38.02 |
| 6,552,301 B2 | 4/2003 | Herman et al. |
| 6,778,565 B2 | 8/2004 | Spuehler et al. |
| 6,856,640 B2 | 2/2005 | Henrich et al. |
| 7,813,389 B2 * | 10/2010 | Peng et al. ............ 372/26 |
| 8,160,113 B2 * | 4/2012 | Adams et al. ............ 372/25 |
| 2006/0018349 A1 | 1/2006 | Kopf et al. |
| 2006/0245456 A1 | 11/2006 | Lasri et al. |
| 2007/0272668 A1 | 11/2007 | Albelo et al. |
| 2009/0323741 A1 | 12/2009 | Deladurantaye et al. |
| 2010/0128744 A1 | 5/2010 | Deladurantaye et al. |

OTHER PUBLICATIONS

U.S. Appl. No. 12/780,556, filed May 14, 2010.
Forrester, P. et al. "Effects of heat transfer and energy absorption in the ablation of biological tissues by pulsetrain-burst (>100 MHz) ultrafast laser processing", Proc. of SPIE, vol. 6343, Photonics North 2006, pp. 1-7.
Nebel, A. et al. "Generation of tailored picosecond-pulse-trains for micro-machining", LASE Conference: Commercial and Biomedical Applications of Ultrafast Lasers IV, Paper No. 6108-37, Photonics West 2006, pp. 1-8.

* cited by examiner

*Primary Examiner* — Thuy Vinh Tran
(74) *Attorney, Agent, or Firm* — Merchant & Gould P.C.

(57) ABSTRACT

A circuit assembly controlling an optical system to generate optical pulses is provided. The optical system includes a seed light source optically coupled to an amplitude modulator. The circuit assembly includes a control circuit which generates a pulsed seed drive signal for driving the seed laser source, as well as logic signals defining successions of ON and OFF states and having a predetermined relative timing relationship. One or more of the logic signals is delayed by a corresponding programmable delay line to adjust the relative timing relationship between the logic signals. A logic gating module combines the logic signals according to one or more logical rule, thereby providing a modulator drive signal. Using this circuit assembly, the optical system outputs an optical pulse at each ON state of the modulator drive signal synchronized with the passage of one of the seed optical pulses through the amplitude modulator.

38 Claims, 13 Drawing Sheets

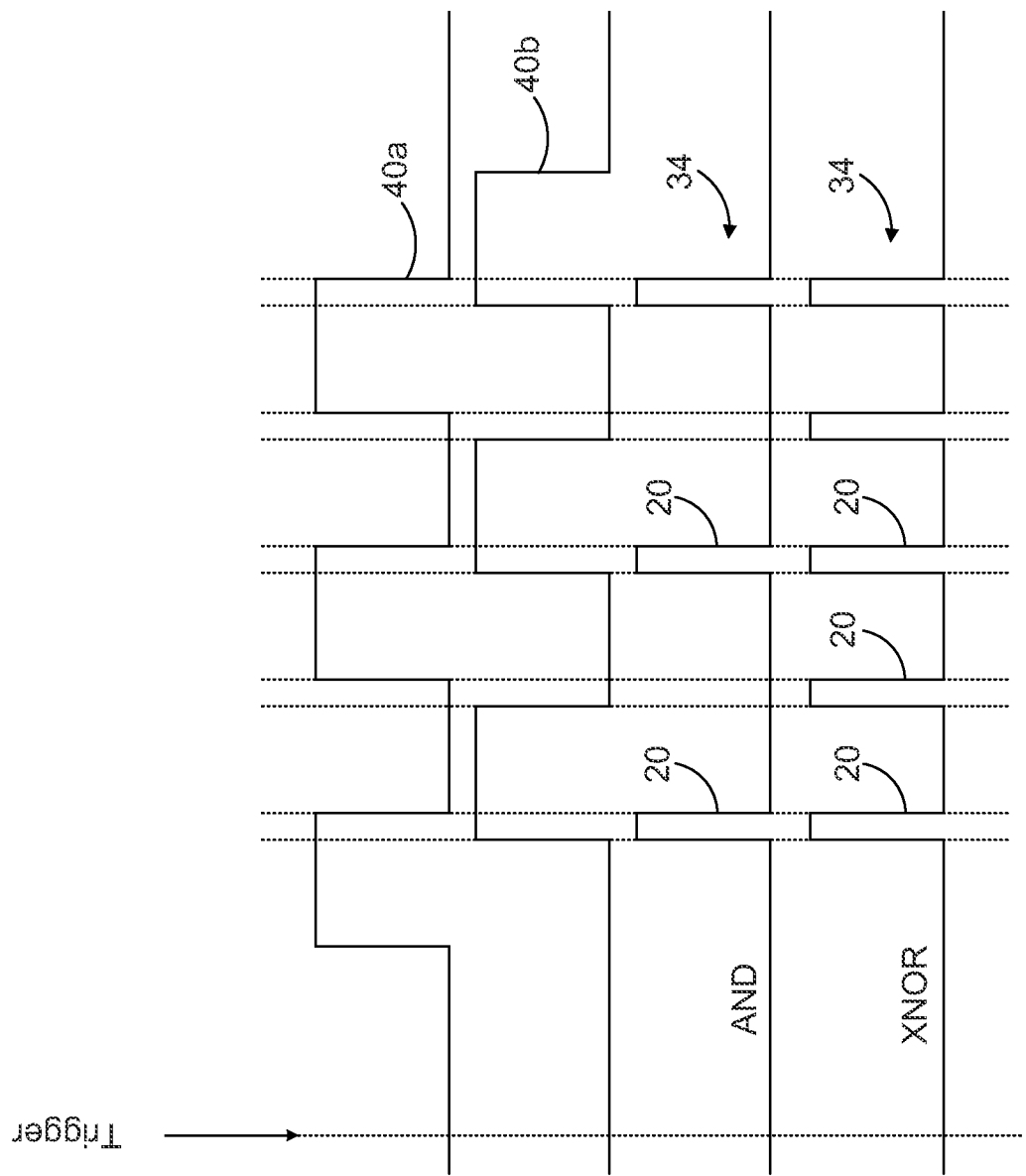

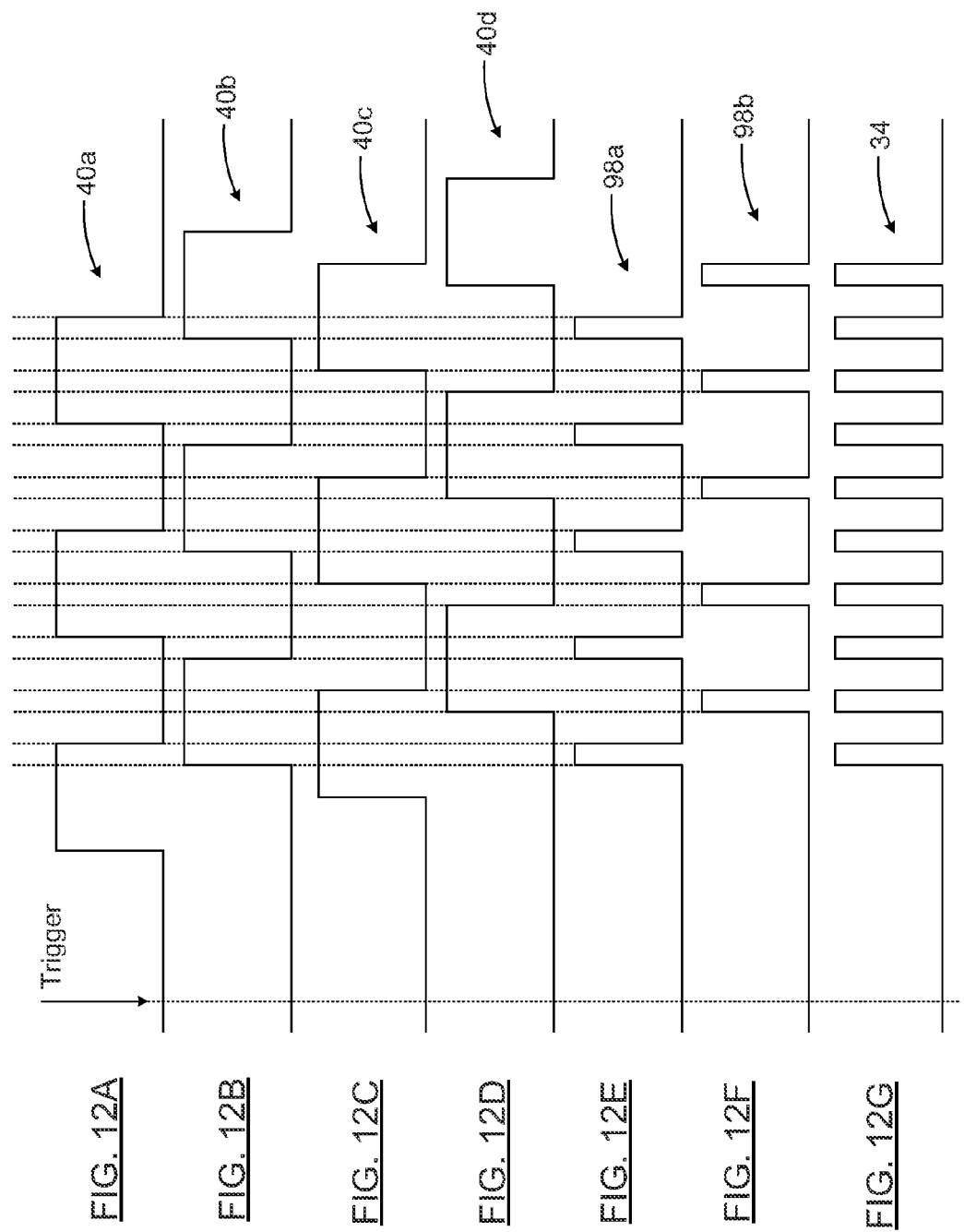

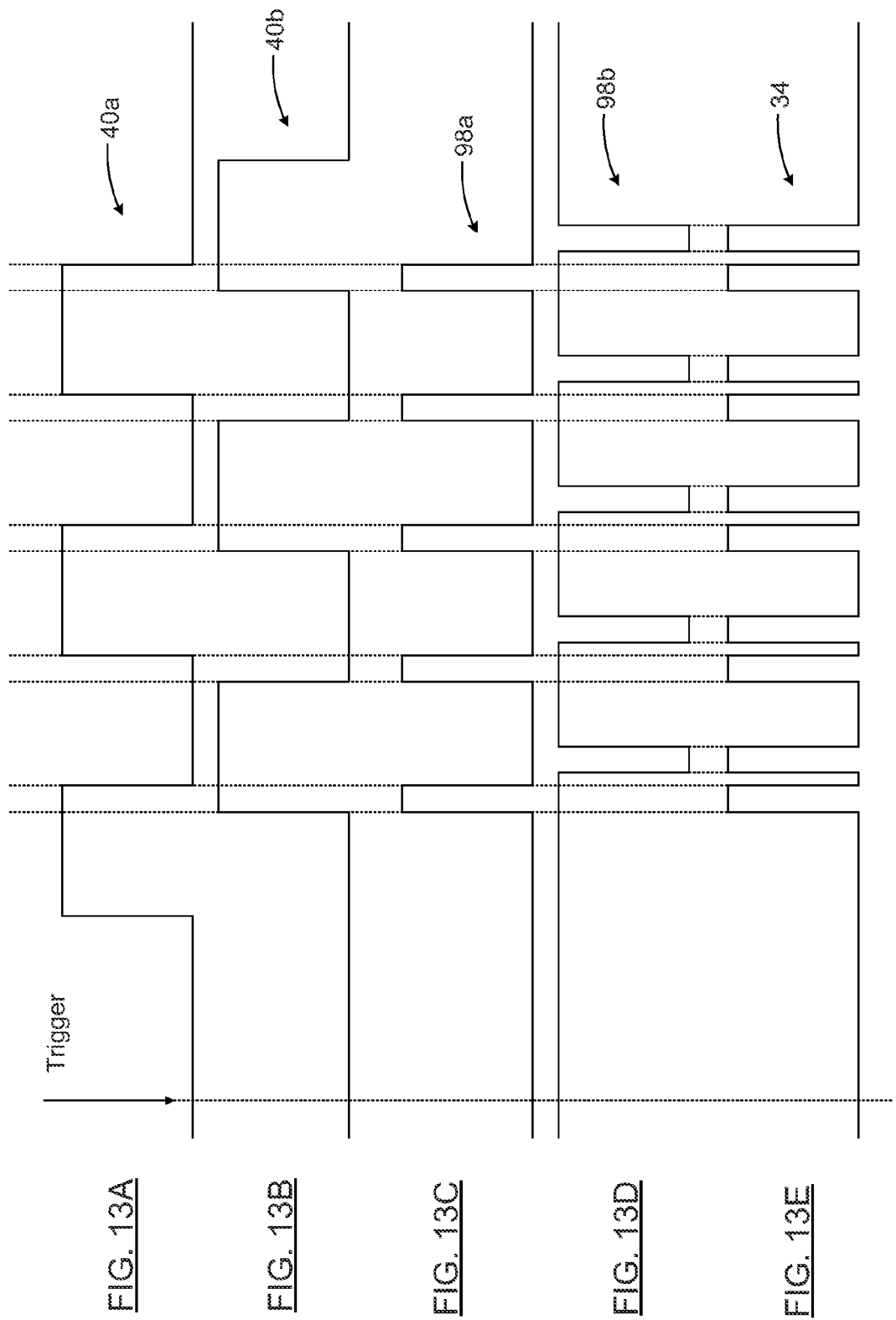

CIRCUIT ASSEMBLY FOR CONTROLLING AN OPTICAL SYSTEM TO GENERATE OPTICAL PULSES AND PULSE BURSTS

FIELD OF THE INVENTION

The present invention generally relates to pulsed lasers and other light sources and more particularly concerns an optical system and circuit assembly therefor capable of generating optical pulses in the picosecond range, with tunable repetition rate, amplitude and duration.

BACKGROUND

High power pulsed fiber lasers are currently in demand for a number of applications and uses. For example, numerous material processing applications such as memory repair, milling, micro-fabrication, drilling, etc. require pulsed laser systems which provide, among other requirements, high pulse energy, excellent pulse amplitude stability and beam quality, narrow linewidth and great flexibility in terms of control of the pulse amplitude and temporal duration, such as pulse to pulse control over the temporal duration at high (>100 kHz) repetition rates. Pulse bursting with in-burst pulse rate >100 MHz is also desirable.

The temporal duration of laser pulses is an important parameter for the optimization of laser material processing procedures, as for example explained in U.S. patent application no 2007/0272668 (ALBELO et al). Laser pulses in the millisecond to nanosecond regime are used to machine several types of material, providing high processing speed. However, such long pulses can cause heating, melting and vaporization of the target material, which leads to undesired thermal side-effects such as low quality of the machined surface and micro-cracks. It is known in that art that a limited heat-affected zone on the processed material and little or no collateral damage is typically obtained from cold ablation performed with femtosecond optical pulses. However, femtosecond lasers are often complex and expensive. In addition, the ablation process is inherently slow, since the layer which is removed is usually very thin compared to that obtained using thermal ablation with longer pulses.

Picosecond laser pulses are increasingly gaining attention in the industry. The time scale involved in such processes combines the benefits of light-matter interaction dynamics at both femtosecond and nanosecond regimes. For instance, laser pulse energy on a work surface may be increased above the cold ablation threshold while providing a higher speed process than femtosecond pulses. Trains of picosecond laser pulses emitted at high repetition rates in a burst regime are also very interesting to the industry (see for example P. Forrester et al., "*Effects of heat transfer and energy absorption in the ablation of biological tissues by pulse train-burst (>100 MHz) ultrafast laser processing*", Proc. of SPIE Vol. 6343, 63430J (2006); P. Forrester, et al., "*Generation of tailored picosecond-pulse-trains for micro-machining*", Proc. of SPIE Vol. 6108, 6108-37 (2006); and U.S. Pat. No. 6,552,301, issued Apr. 22, 2003 to HERMAN et al.). Under such conditions, the time interval between successive pulses is short enough for heat to accumulate at the work surface, thus conditioning the material for subsequent ablation by multiphoton ionization with high laser beam intensities. This ensures a clean ablation with smooth features.

The cold ablation threshold may vary significantly depending on several parameters, such as the material being processed, the pulse repetition rate, the pulse duration and the laser wavelength. Also, the quality of the laser machined surface and the machining speed are strongly dependent on these parameters. For these reasons, the optimization of the machining process for a specific material can greatly benefit from laser architectures that provide control on the pulse repetition rate, amplitude and duration, in simple pulse or burst regimes. Furthermore, the ability to adjust the pulse duration and amplitude from pulse to pulse provides further flexibility for process speed and quality optimization. For instance, the same laser could be used with long pulses to thermally ablate large amounts of materials, followed by short pulses or pulse bursts that would provide a better quality of machined surface.

It is also of interest that picosecond pulses are characterized by a high peak power (tens to hundreds of kilowatts for micro-joules pulses) and a narrow linewidth (less than 1 nm for transform limited pulses). This combination is very advantageous for frequency conversion (second, third and fourth harmonic), which opens up significantly the range of applications a single powerful picosecond source can address.

Mode-locked femtosecond laser, bulk or fiber-based, can be modified to produce picosecond pulses. Generally speaking, mode-locked fiber lasers are considered particularly attractive for ultra-short pulse generation, via either passive or active mode-locking. The pulse-generation mechanism in such lasers depends on the physic of the cavity. Known cavity configurations include linear cavities, ring lasers and figure-of-eight cavities. To produce picosecond pulses in such a mode-locked regime, a narrow spectral filter placed inside the laser cavity controls the duration of the pulses by the virtue of the Fourier transform. Usually, such designs suffer from a lack of flexibility since they require a tuning of the filter bandwidth to change the pulse duration. This tuning can necessitate moving parts.

Mode-locked lasers can also be adapted for producing picosecond pulse trains combined with a slicer or pulse picker, which selects the pulses that constitute the "burst". Actively mode-locked fiber lasers allow for the generation of picosecond pulses at high repetition rates, such as for example shown in U.S. Pat. No. 6,108,465 (IIDA et al.) and U.S. patent application published under no. 2006/0245456 (LASRI et al.). However, the timing between successive pulses cannot be adjusted arbitrarily; it is rather determined by the harmonics of the laser cavity and the fundamental pulse repetition frequency. Additionally, tunable pulse durations of a few tens of picoseconds are difficult to obtain, since complex pulse shaping mechanisms occur along the pulse propagation within the fiber laser cavity.

Picosecond pulses can also be produced with gain-switched semiconductor laser diodes, where pulses are advantageously generated on demand by an electrical drive pulse. However there is usually little correlation between the temporal characteristics of the electrical drive pulse and the corresponding optical pulse. The optical pulse is in fact the impulse response of the device, and therefore has a duration which differs from chip to chip. In addition, such diodes offer very little control on the amplitude of the emitted pulses, which are often followed by relaxation oscillations.

Solid-state gain media may be used for high repetition rate ultrashort (e.g. picosecond or less) pulse lasers (see for example U.S. Pat. No. 6,778,565 (SPUEHLER et al.) U.S. Pat. No. 6,856,640 (HENRICH et al.)). Although some references address the tailoring of pulse train sequences emitted from such systems (see U.S. patent application published under no 2006/0018349 (KOPF et al.)), most schemes relying on solid-state lasers provide very limited or no tuning of the pulse repetition rate and pulse duration. In addition, solid-state lasers lack the near diffraction-limited beam quality that sets apart fiber lasers and amplifiers from other types of laser sources.

A pulsed source with a tunable pulse duration and amplitude is disclosed in U.S. Pat. No. 7,813,389 (PENG et al). However, the minimum pulse width of this source cannot reach the picosecond regime as it is limited to 1 ns, with rise time between 1 ns and 3 ns and even longer fall time.

Another pulsed source with a tunable pulse duration is disclosed in U.S. Pat. No. 5,742,634 (RIEGER et al). However the disclosed source is a bulky free space laser, the pulse width range covered by this source is limited from 60 ps to 300 ps and the repetition rate is as low as 10 kHz, with no bursting capabilities.

There remains a need for fiber lasers able to produce pulses and bursts of pulses in the picosecond range and alleviating at least some of the drawbacks of the technologies described above. Such fiber lasers may be better suited to the requirements of micromachining and similar industrial applications. Incoherent sources able to produce pulses and bursts of pulses in the picosecond range are also of interest in other various applications, including gated illumination systems.

SUMMARY OF THE INVENTION

In accordance with a first aspect of the present invention, there is provided a circuit assembly for controlling an optical system to generate optical pulses, the optical system including a seed light source optically coupled to an amplitude modulator.

The circuit assembly first includes a control circuit for generating a pulsed seed drive signal for driving the seed light source. The control circuit further generates a plurality of logic signals in coordination with the seed drive signal. The logic signals each defines a succession of ON and OFF states and have a predetermined relative timing relationship.

The circuit assembly also includes at least one programmable delay line, each of which receiving one of the logic signals for delaying this logic signals to adjust the relative timing relationship mentioned above. A logic gating module is further provided, for combining the logic signals according to at least one logical rule, thereby providing a modulator drive signal for driving the amplitude modulator. The modulator drive signal defines a succession of ON states and OFF states determined by the ON and OFF states of the logic signals, the adjusted relative timing relationship of the logic signals and the at least one logical rule.

Using this circuit assembly, the optical system outputs one of the optical pulses at each ON state of the modulator drive signal synchronized with the passage of one of the seed optical pulses through the amplitude modulator.

In accordance with another aspect of the invention, there is also provided an optical system for generating optical pulses. The optical system includes a seed light source, an amplitude modulator optically coupled to the seed light source, and a circuit assembly controlling the seed light source and amplitude modulator. The circuit assembly includes a control circuit for generating a pulsed seed drive signal for driving the seed light source. The control circuit further generates a plurality of logic signals in coordination with the seed drive signal. The logic signals each defines a succession of ON and OFF states and have a predetermined relative timing relationship. The circuit assembly also includes at least one programmable delay line, each of which receiving one of the logic signals for delaying this logic signals to adjust the relative timing relationship mentioned above. A logic gating module is further provided, for combining the logic signals according to at least one logical rule, thereby providing a modulator drive signal for driving the amplitude modulator. The modulator drive signal defines a succession of ON states and OFF states determined by the ON and OFF states of the logic signals, the adjusted relative timing relationship of the logic signals and the at least one logical rule. The optical system therefore outputs one of the optical pulses at each ON state of the modulator drive signal synchronized with the passage of one of the seed optical pulses through the amplitude modulator.

In accordance with yet another aspect of the invention, there is further provided a method for outputting optical pulses, comprising:

a) generating a pulsed seed drive signal;
b) driving a seed light source with the seed drive signal to generate seed optical pulses;
c) generating a pulsed modulator drive signal in coordination with the seed drive signal, the generating of the modulator drive signal comprising the substeps of:
  i. generating a plurality of logic signals each defining a succession of ON and OFF states, the logic signals having a predetermined relative timing relationship;
  ii. delaying at least one of the logic signals to adjust said relative timing relationship; and
  iii. combining the logic signals according to at least one logical rule, thereby providing the modulator drive signal, the modulator drive signal defining a succession of ON states and OFF states determined by the ON and OFF states of the logic signals, the adjusted relative timing relationship of the logic signals and the at least one logical rule; and
d) driving an amplitude modulator optically coupled to the seed light source using the modulator drive signal;
whereby the optical pulses are outputted at each ON state of the modulator drive signal synchronized with the passage of one of the optical pulses through the amplitude modulator.

Advantageously, embodiments of the invention may provide picosecond pulses and pulse bursts with individual pulse duration between a few picoseconds to a few nanoseconds. Individual pulses and bursts may be generated on demand or with typical repetition rates up to 5 MHz. The minimum time period between successive pulses within a burst may be adjustable down to 1 nanosecond, and each burst may include from 1 (single pulse case) to hundreds of pulses. In some embodiments, the amplitude of pulses may be tunable within a burst and from burst to burst.

Other features and advantages of the present invention will be better understood upon a reading of preferred embodiments thereof, with reference to the appended drawings.

BRIEF DESCRIPTION OF THE DRAWINGS

FIGS. 11A to 11D are timing diagrams illustrating the generation of logic pulses using a logic gate module such as shown in FIG. 9A.

FIGS. 12A to 12G are timing diagrams illustrating the generation of logic pulses using a logic gate module such as shown in FIG. 9B.

FIGS. 13A to 13E are timing diagrams illustrating the generation of logic pulses using a logic gate module such as shown in FIG. 9C.

DESCRIPTION OF PREFERRED EMBODIMENTS OF THE INVENTION

The present invention provides devices and method generating optical pulses, and may be particularly advantageous for generating optical pulses of duration in the picosecond range. Embodiments of the present invention generally involve the generation of a seed optical pulse by a pulsed light source, and the modulation of the seed optical pulse by an amplitude modulator. The timing of the opening and closing of the amplitude modulator with respect to the arrival of the seed optical pulse thereat will determine the final shape of the optical pulses. The present invention provides a circuit assembly allowing the generation of fast electrical pulses for driving the amplitude modulator, as will be described further below. In some embodiments, the amplitude modulator may "chop" the seed optical pulses in several sub-pulses, so that each seed pulse can result in one burst of sub-pulses.

In the description below, the embodiments presented are based on the use of a laser within a seed light source, which will therefore be referred to as a "seed laser source" while the optical system may also be referred to as a "laser system". One skilled in the art will however understand that light generating devices other than lasers, such as for example a light-emitting diode, are also considered within the scope of the present invention.

While embodiments of the present invention may be particularly useful for producing pulses or sub-pulses having a duration and the picosecond range, it will be understood by one skilled in the art that this characteristic is not limitative to the invention and that circuit assemblies, laser systems or methods according to other embodiments of the invention may be useful to produce longer or shorter pulses or sub-pulses.

Figure 1:
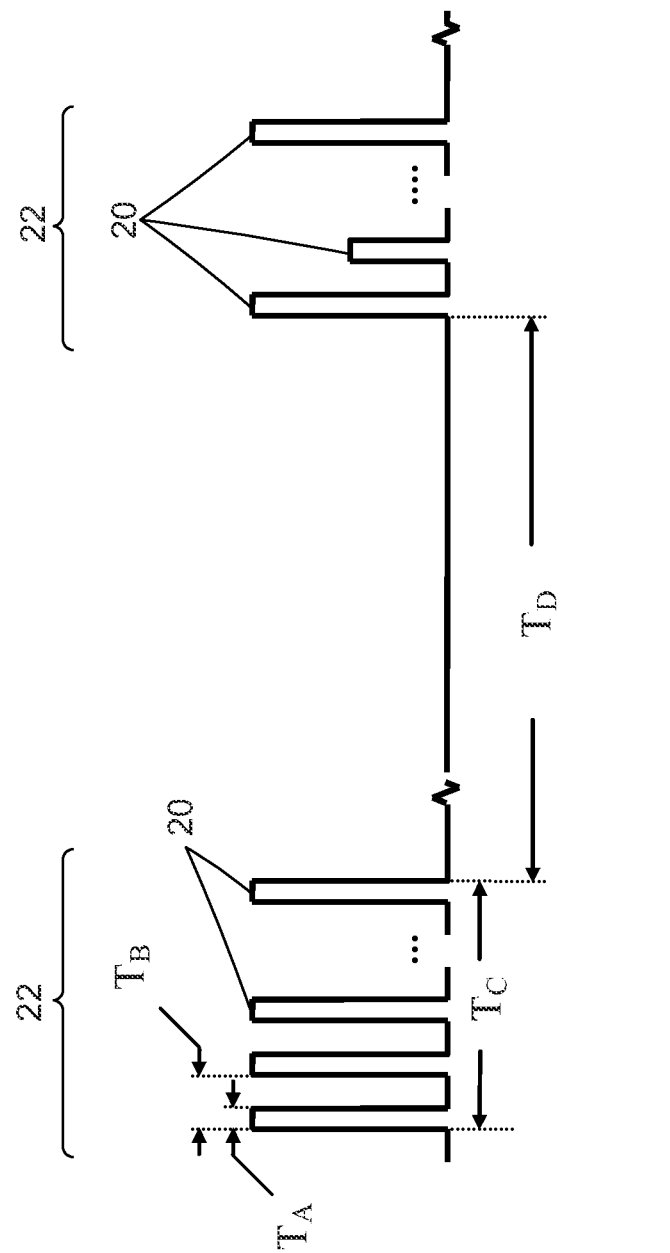
FIG. 1 is a schematized representation of successive bursts of pulses.

The expression "optical pulses" is understood herein to refer to the discrete onset of electromagnetic radiation separated by interpulse periods where light is absent or negligible. Optical pulses according to embodiments of the invention may be generated individually, in a "pulse train" or in "bursts". The expression "pulse train" is usually understood to refer to a periodic or quasi-periodic succession of pulses. A "burst" of optical pulses is understood to refer to a series of consecutive pulses (sometimes referred to in this context as "sub-pulses") separated from previous and subsequent pulses by a long period of time compared to the time scale of the sub-pulses. The various time parameters characterizing bursts of optical pulses are best understood with respect to FIG. 1. $T_A$ designates the duration of one pulse or sub-pulse 20, $T_B$ the period of the pulses within a burst 22, $T_C$ the total burst duration, and $T_D$ the time separation between subsequent bursts 22.

The terms "light" and "optical" are used herein to refer to electromagnetic radiation of any appropriate wavelength. While the described embodiments are particularly directed to the infrared (IR) and near infrared (NIR) regime, this aspect is in no way considered limitative to the scope of the invention.

Embodiments of the present invention are particularly useful for micromachining applications, where it can be desirable to adapt time parameters of a laser source to provide particular pulse characteristics, such as, for example, a pulse duration from 10 ps to 5 ns with repetition rate ranging from on-demand pulsing to 5 MHz and more, and pulse bursts containing from one to hundreds of sub-pulses with a sub-pulse period of the order of 1 ns and burst repetition rate ranging from on-demand pulsing up to 5 MHz and more. However, embodiments of the invention are not limited to such applications and can also be adapted for other applications such as memory repair, milling, micro-fabrication, drilling and other material processing applications, as well as remote sensing or any other application which may benefit from on-demand or periodic pulses or pulse bursts.

Optical System and Circuit Assembly

Figure 2:
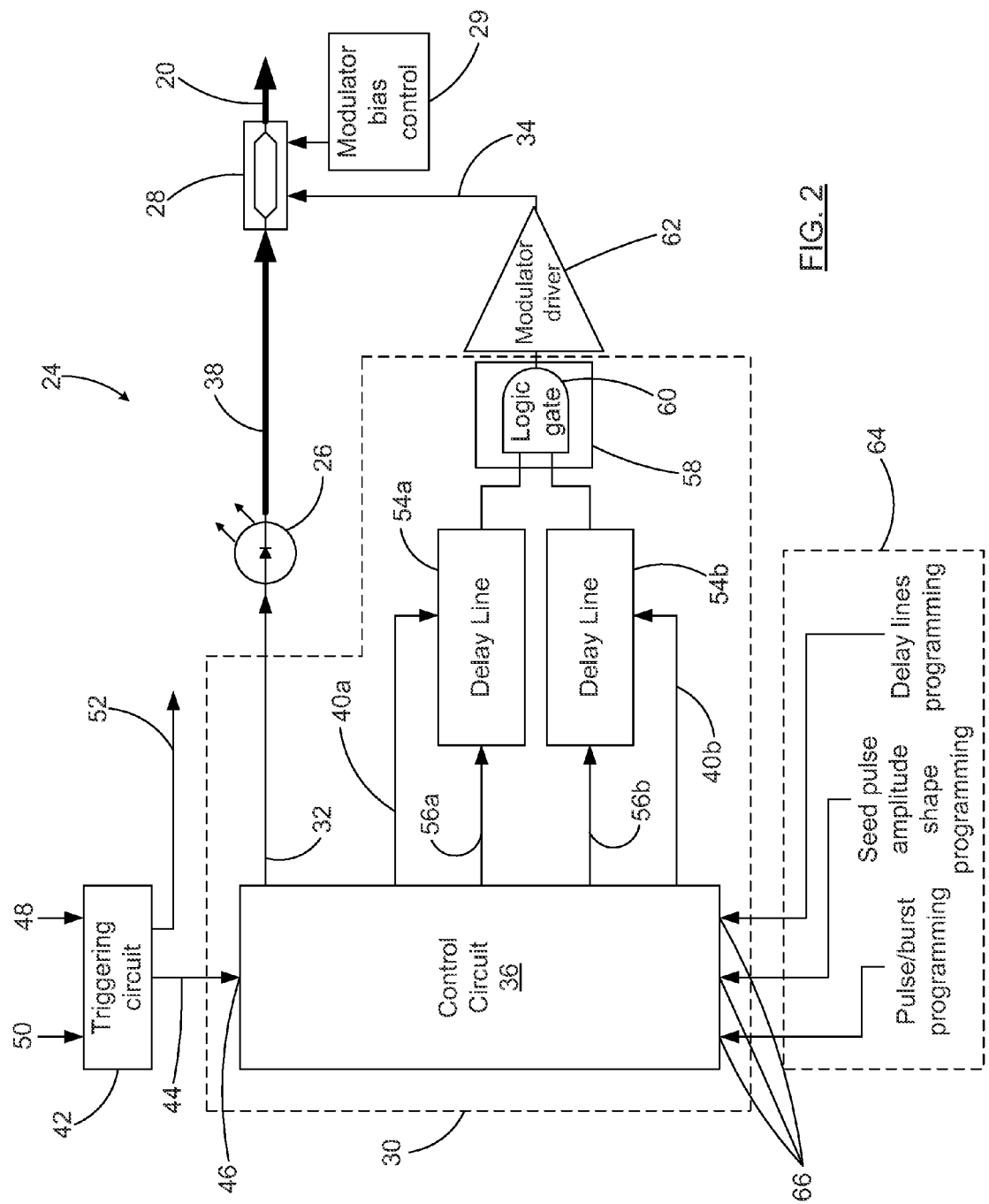
FIG. 2 is a schematic representation of an optical system according to an embodiment of the invention.

Referring to FIG. 2, there is shown an optical system 24 according to an embodiment of the present invention. The optical system 24 includes a seed light source 26 and an amplitude modulator 28 optically coupled to the seed light source 26.

The seed light source 26 may for example be embodied by a semiconductor laser diode, a Q-switched solid state laser, a pulsed fiber laser, a light-emitting diode or any other device or assembly apt to generate seed optical pulses, preferably, although not limitatively, in the nanosecond range, in response to an electrical drive signal. In other embodiments, the seed light source 26 may be embodied by a continuous wave (cw) light source generating a continuous wave light beam followed by one or more seed amplitude modulators pulsing the continuous wave light beam to provide the seed optical pulses. The seed amplitude modulator could be embodied by an acousto-optic, electro-absorption or electro-optic device. It will be understood that the use of the expression "seed" is meant herein to refer to the fact that the light generated by the seed laser source is meant to be modified in some fashion before exiting the laser system 24, and is not meant to limit the use of the invention to applications where the generated light undergoes amplification, a context in which the expression "seed" is often encountered.

The amplitude modulator 28 is preferably embodied by an electro-optical modulator or an electro-absorption modulator or any other device apt to selectively block an optical path at the required speed of the target application of the laser system 24. Amplitude modulators with 3 dB bandwidth larger than 30 GHz (example: lithium niobate modulators from EOspace (corporate name)), working at various wavelengths (example: 0.8, 1.06, 1.3, 1.55 micron) are commercially available.

By "optical coupled", it is understood that the amplitude modulator 28 is positioned in the optical path of the light outputted by the seed laser source 26 in such a manner as to successively block or allow such light through. Light may travel between the seed laser source 26 and modulator 28 though free space or through a waveguide such as an optical fiber or the like. Of course, additional optical components may be provided between the seed light source 26 and modulator 28, such as lenses, mirrors, gratings, polarization controllers or any other components directing or modifying the travelling light in an appropriate fashion.

The laser system 24 further includes a circuit assembly 30 which provides a pulsed seed drive signal 32 and a pulsed modulator drive signal 34, for respectively controlling the seed laser 26 source and the amplitude modulator 28.

The circuit assembly 30 first includes a control circuit 36. The control circuit 36 generates the pulsed seed drive signal 32 and is electrically connected to the seed laser source 26 for driving the same with the seed drive signal 32 to generate seed optical pulses 38. In cases where the seed laser source is based on a pulsed laser, the pulsed seed drive signal 32 may be used to control the current of the pulsed laser in order to output the desired seed light pulses directly. Alternatively, if the seed light is pulsed by one or more seed amplitude modulators, the seed drive signal may be used to control the opening and closing of the seed amplitude modulators. Depending on the manner in which the seed light pulses are generated, more than one pulsed seed drive signals 32 may be required and therefore generated by the control circuit 36. Typically, the seed drive signal may define electrical pulses of pulse width between 5 ns and 100 ns, although other pulse duration could be considered within the scope of the present invention. In one embodiment, the pulsed seed drive signal 32 is non periodic and triggered on demand. In alternative embodiments, the pulsed seed drive signal 32 may be periodic or quasi-periodic. The repetition rate of the pulsed seed drive signal 32 preferably ranges from on demand pulsing up to about 5 MHz. In preferred embodiments, the repetition rate of the pulsed seed drive signal 32 may be between 100 kHz to 1 MHz.

In some embodiments, the amplitude of the seed drive signal 32 may be constant over the duration of a given pulse. In other embodiments, it may vary over the duration of a pulse and/or from pulse to pulse.

In some embodiments, the seed drive signal 32 may have a user-defined amplitude profile, that is, the amplitude profile of the seed drive signal 32 may be changed, designed, programmed, selected or otherwise affected by parameters determined by a user. For this purpose, the control circuit 36 may for example incorporate components of or may be connected to a digital pulse shaping module such as the one described in the U.S. patent application published under no. 2009/0323741 (DELADURANTAYE et al.), entitled, "Digital laser pulse shaping module and system", the contents of which are incorporated herein by reference. Of course, other platforms, either analog or digital, may be used to provide the user-defined aspect of the amplitude profile of the seed drive signal 32.

It will be readily understood that the amplitude profile of the seed drive signal 32 will determine the amplitude profile of the light pulses generated by the seed light source 26, but that these optical pulses will not necessarily have the exact same amplitude profile as the seed drive signal. One skilled in the art will know to adapt the shape of the seed drive signal 32 in order to obtain a desired optical output, in view of the response and particularities of the seed light source 26 and other components used in a given embodiment of the invention. For illustrative purposes, several examples of optical outputs obtained using complex seed drive signals are shown in U.S. patent application published under no. 2009/0323741 (DELADURANTAYE et al.).

As one skilled in the art will readily understand, the seed drive signal 32 may be provided to the seed laser diode 26 through an appropriate electrical connection. Additional components for conditioning or adapting the seed drive signal to the particular characteristics of the seed laser source 26 may optionally be provided. By way of example only, a driver circuit such as shown in co-assigned U.S. patent application Ser. No. 12/780,556 filed on May 14, 2010 by DESBIENS et al may be used.

The control circuit 36 further generates a plurality of logic signals 40. In the illustrated embodiment, only two logic signals are generated, a first logic 40a and a second logic 40b, although one skilled in the art will readily understand that more logic signals could be provided without departing from the scope of the present invention. Each logic signals 40 defines a succession of ON and OFF states. Preferably, the logic signals 40 are composed of a sequence of one or more electrical pulses, each pulse representing an appropriate logic state, for example the ON state. The pulses are separated by an interpulse period representing an opposite logic state, for example the OFF state. Alternatively, the presence of an electrical pulse may represent the OFF state whereas the interpulse pulse period would then represent the ON state. In typical implementations of the present invention, each pulse and interpulse period have a typical minimum duration within a range of 1 ns to 100 ns. The logic signals 40 have a predetermined relative timing relationship, that is, the onset of the ON and OFF states of one logic signal occur at predetermined moments in time with respect to the ON and OFF states of the other logic signals. The logic signals 40 as generated by the control circuit 36 may for example be identical and fully synchronized; however, in other embodiments they may not represent the same logic sequence or have the same amplitude shape, and/or may be delayed with respect to one another.

The control circuit 36 generates the logics signals 40 in coordination with the seed drive signal 32, that is, the relative timing between the logic signals 40 and seed drive signal 32 is sufficiently well known and/or controlled in order to enable a synchronization of the seed optical pulses 38 and modulator drive signal 34 at the amplitude modulator 28. Of course, one skilled in the art will readily understand that this synchronization should also take into consideration the delays experienced by the various signals travelling in the system which have an impact on the timing of the arrival of the seed optical pulses 38 and modulator drive signal 34 at the amplitude modulator 28, and will know how to properly coordinate the logic signals 40 and seed drive signal 32 in order to obtain the desired timing.

In an embodiment of this invention, the control circuit can be implemented in a Field-programmable Gate Array (FPGA) integrated circuit. Such a circuit can effectively produce programmable logic sequences composed by pulses with typical minimum duration of 1 ns and minimum interpulse period of 1 ns.

In one embodiment, the laser system 24 may include a triggering circuit 42 connected to the control circuit 36. The triggering circuit 42 generates a logic trigger signal 44 which is provided to a trigger input 46 of the control circuit 36. The generation of the seed drive signal 32 and of the logic signals 40 is triggered by the trigger signal 44. The logic trigger signal 44 is either derived from an internal clock (not shown), from an external clock reference signal 48 or from a non-periodic user trigger signal 50. Hence, the logic trigger signal 44 can be generated on user demand or on a periodic timeframe, with a frequency up to 5 MHz or more.

In some embodiments, the triggering circuit 42 also may generate an auxiliary trigger signal 52, synchronous with the logic trigger signal 44, which can be used to control additional components not shown herein as part of the laser system 24. This feature can be useful to implement additional functions at the output of the laser system 24, these functions including, without being limited to, high power amplification, interlocking, synchronized phase modulation (see for example U.S. patent application published under no. 2010/0128744 by DELADURANTAYE et al.), output switching and others.

Still referring to FIG. 2, the circuit assembly 30 further includes one or more programmable delay lines 54, each associated with one of the logic signals 40. In the illustrated embodiment, each of the two logic signals 40a and 40b circulates in a corresponding programmable delay line 54a, 54b, although one skilled in the art will readily understand that a programmable delay line 54 could be associated with only one of the two logic signals 40, the other being undelayed or circulated through a fixed delay line. The programmable delay lines 54a and 54b adjust the relative timing relationship between the two logic signals 40a and 40b, that is, adapt the timing of the ON and OFF states of the logic signals so that their synchronization can be changed at will. By "programmable", it is understood that the delay lines 54a and 54b may be controlled to impose and change as desired a delay on the corresponding logic signal 40a or 40b. Preferably, the delay lines are programmable through the control circuit 36, which send a corresponding delay control signal 56a, 56b to the programmable delay lines 54a, 54b. By way of example, delay lines are commercially available with programmable delay up to few nanoseconds and delay resolution down to 5 ps, such as for example model SY89297U from Micrel (corporate name).

In one embodiment, the laser system 20 includes a user interface 64 connected to the control circuit 36 for providing user defined parameters thereto. The control circuit 36 preferably has one or more user inputs 66 for receiving the user defined parameters. The user defined parameters may for example include the predetermined timing relationship of the logic signals 40, a delay for programming a corresponding programmable delay line 54, and/or user-defined amplitude profile of the seed drive signal 32.

Figure 8:
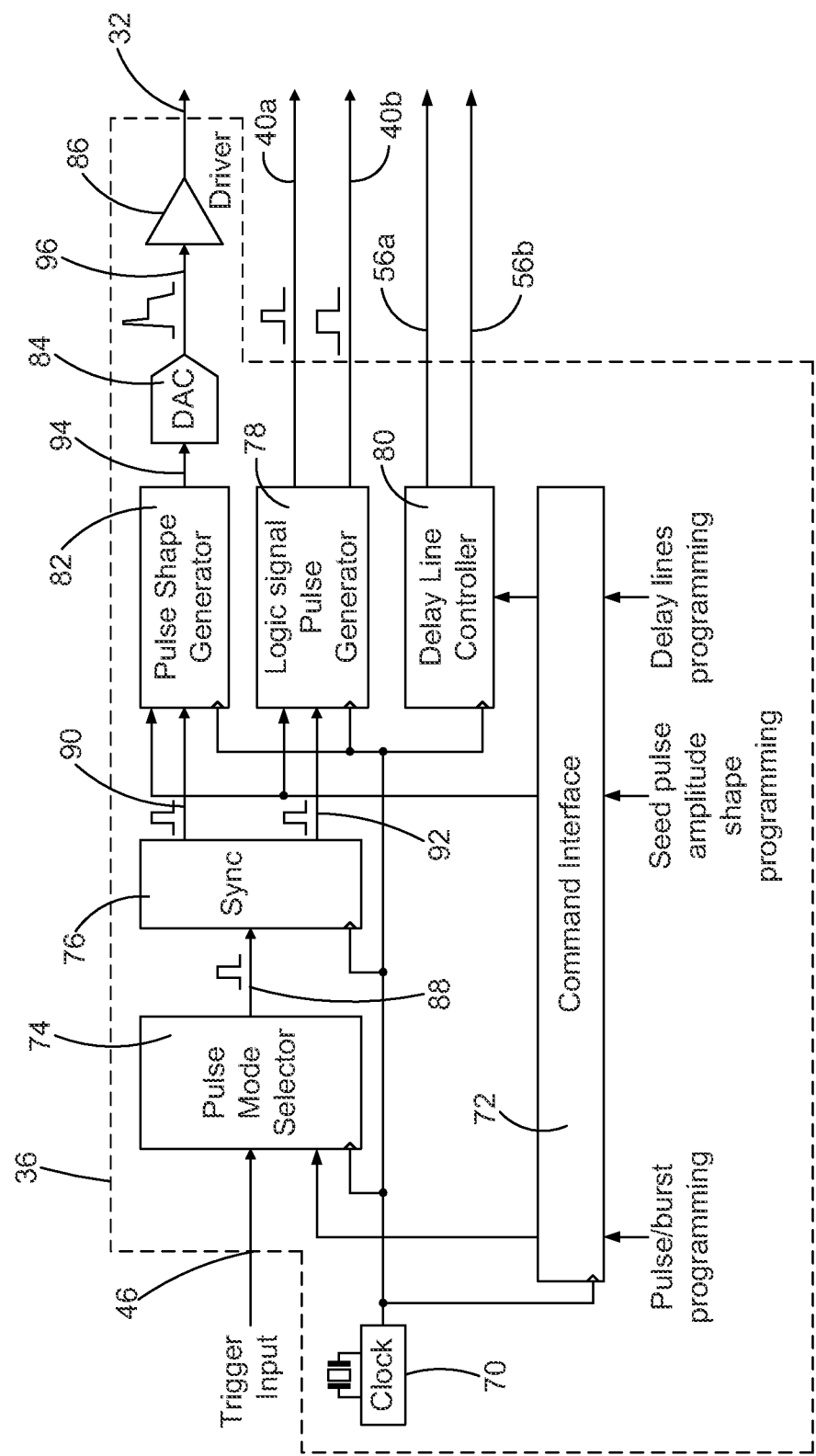
FIG. 8 is a schematic representation of the internal architecture of a control circuit according to one embodiment of the invention.

Referring to FIG. 8, the internal architecture of a control circuit according to one embodiment of the invention is illustrated. It will be understood by one skilled in the art that this particular architecture is given by way of example only and that other configurations could easily be envisioned without departing from the scope of the present invention.

The control circuit 36 includes the elements necessary to generate the electrical seed drive signal 32 and the logic signals 40 following a triggering event, for example, a rising edge, at the trigger input 46. In the illustrated embodiment, the control circuit 36 includes a clock generator 70, a user command interface 72, a pulse mode selector 74, a synchronization stage 76, a logic signal pulse generator 78, a delay line controller 80 and finally, a pulse shape generator 82 followed by a digital-to-analog converter (DAC) 84 and a seed laser driver 86.

Referring to both FIGS. 2 and 8, the clock generator 70 provides a timing reference that preferably guarantees, within one period, the proper relative timings between the output of the seed optical pulses 38 and modulator drive signal 34. The frequency of this clock is typically from several tens to several hundreds of megahertz.

The command interface 72 receives, decodes and transmits to either the pulse mode selector 74, the pulse shape generator 82, the logic signal pulse generator 78 or the delay line controller 80 any command such as a read/write access, either to program as factory settings, or control in real-time, how the electrical pulses generated by these components are outputted by the control circuit 36. Such read/write accesses would typically be performed by a user through the user interface 64, from a remote computer, or from another piece of industrial equipment through a pre-defined standard communication protocol or format such as USB, Ethernet, RS-232, etc.

The pulse mode selector 74 is controlled from the user command interface 72 to output a proper sequence of one or more control pulses 88 following a triggering event at the trigger input 46. The pulse output mode may be chosen to be either a single, one-shot pulse, pulse train mode or burst mode. The pulse mode selector 74 may also receive other functional parameters from the user command interface 72, such as the number of pulses to output in burst mode, or the inter-pulse period in pulse train mode or burst mode.

The synchronization stage 76 operates typically in order to compensate any systematic delay or offset that may prevent the appropriate temporal coincidence of the seed optical pulses 38 and the modulator drive signal 34 when these arrive at their respective input at the amplitude modulator 28. To this end, the synchronization stage 76 detects each incoming control pulse 88 from the pulse mode selector 74 and outputs a first synchronizing pulse 90 to the pulse shape generator 82 and a second synchronizing pulse 92 to the logic signal pulse generator 78. Generally, the first and second synchronizing pulses 90 and 92 are not coincident, as one may be outputted before the other. Such deliberate delay between the two synchronizing pulses 90 and 92 effectively compensates the difference of propagation delays that may exist in the path from the pulse mode selector 74 through the pulse shape generator 82 up to the optical input of the amplitude modulator 28, with respect to the other path from the pulse mode selector 74 through the logic signal generator 78, and up to the gating input of the amplitude modulator 28.

The pulse shape generator 82 detects the first synchronizing pulse 90 from the synchronization stage 76 and upon such detection outputs a finite sequence of binary words 94. This sequence 94 is input to the digital-to-analog converter (DAC) 84 in order to generate an electrical analog shape signal 96 that, once conditioned by the seed laser driver 86 or a buffer amplifier, will embody the seed drive signal 32. The binary word shape sequence may contain from a few tens to a few hundred words. Words may be written in the DAC 84 at a rate typically from a few hundred megahertz up to 1 gigahertz. A single binary word, or shape sample, is typically an 8-bit, up to is 16-bit word, in order to provide some capability to compensate non-linearities in the seed laser source 26 and the amplitude modulator 28. The pulse shape generator 82 may contain a single or a plurality of shape sequences stored in a memory buffer (not shown). When the memory buffer contains several shape sequences, the one to be outputted by the shape generator 82 may be implemented as a fixed factory setting, or it may be dynamically selected in real-time and from shape-to-shape by way of a command received through the command interface 72. The number of shape sequences in the memory buffer has no practical limit, except for the design-specific requirements that usually impose compromises or limitations, such as cost, available board area, etc. Finally, the shape memory buffer may be of several types, such as read-only memory (ROM) with a fixed contents programmed in factory, or random-access memory (RAM) that may be written in real-time through the user interface, or electrically erasable programmable read-only memory (EEPROM) that may be re-programmed in the field by the user with a new set of shape sequences, possibly through the command interface 72.

The logic signal pulse generator 78 preferably operates similarly to the pulse shape generator 82. It detects the second synchronizing pulse 92 from the synchronization module and upon such detection, outputs the required number of logic signals 40. As mentioned above, the logic signals 40 are not necessarily identical and not necessarily generated in the same clock cycle. Each pulse of a logic signal 40 may be as short as, typically, 1 ns, up to several tens or hundreds of ns. Similarly to the pulse shape generator 82, the logic signal pulse generator 78 may contain a set of functional pulse parameters stored in a memory buffer (not shown), such as logic pulse duration, relative logic pulse delay, etc. This memory buffer may also be accessed in several ways and may be implemented through several memory technologies. Finally, it may be beneficial that any set of logic signals functional parameters in this buffer be associated by way of a unique address shared with the pulse shape generator 82, to a particular shape sequence in the pulse shape generator 82.

The delay line controller 80 is preferably included in the architecture of the control circuit 36 for translating commands received from the command interface 72 and re-transmit these commands in the format, speed and protocol compatible with the target delay lines 54 outside the control circuit 36. Such a protocol can for example be embodied by Serial Peripheral Interface (SPI), or serial Inter Integrated Circuit ($I^2C$), or even classical parallel data transfer. The data transmitted consists principally of the desired delay setting for each particular delay line 54. Optionally, the delay values can be stored in a memory buffer (not shown) inside the delay line controller 80 and having functionalities and hardware options as those mentioned above for the pulse shape generator 82 and the logic signal pulse generator 78.

Referring now principally to FIG. 2, the circuit assembly 36 also includes a logic gating module 58 for combining the logic signals 40a, 40b as delayed by the programmable delay lines 54a, 54b, when provided, according to at least one logical rule. In the illustrated embodiment, the logic gate module 58 includes a single logic gate 60, although one skilled in the art will readily understand that a more complex arrangement could be used without departing from the scope of the present invention.

The operation of the logic gate module 58 is best described through a simple example, using the case where the logic gate 60 is embodied by an AND gate, the at least one logical rule being therefore an AND rule. According to such a rule, the output of the logic gate is true only if both inputs are true, i.e. ON states of the modulator drive signal 34 will correspond to the synchronization of respective ON states of the logic signals 40. The expression "synchronization" is understood in this context to refer to events occurring simultaneously in time and space. Assuming that the logic signals 40a and 40b are encoded in such a way that a high voltage level represents an ON logic state and a low voltage level represents an OFF logic state, the output of the AND logic gate will be an ON state (high voltage level) during the periods of time where both the delayed logic signals 40a and 40b reaching the logic gate 60 are ON, and an OFF state the remainder of the time. Of course, other logic gates can be used, with different voltage levels to encode logic states in the logic signals 40a and 40b. In addition, instead of one single logic gate 60, the logic gate module 58 could be implemented with multiple logic ports in a complex arrangement, controlled by more that two logic signals. Such embodiments may further improve the control on the pulses timing in a burst.

By way of example, logic gates are commercially available with bandwidth exceeding 50 GHz and rise time below 10 ps, for example the 50713OR model from INPHI (corporate name) which can be configured to perform the four logic functions OR/NOR/AND/NAND. If such a high speed gate is used, it may output pulses having a full-width half-maximum (FWHM) as short as 10 ps.

The logic function implemented by the logic gate module 58, that is, the overall manner in which the logic gate module affects the inputted logic signals, can be expressed using various equivalent combinations of logic rules, following the well known laws of logic. In embodiments of the logic gate module described below, the implemented logic function is described using one combination of logic gates but one skilled in the art will understand that several logically equivalent combinations can be used to express the same logic function. An example of logical equivalence is provided by the De Morgan's laws:

P NOR Q=NOT (P OR Q)=(NOT P) AND (NOT Q)

P NAND Q=NOT (P AND Q)=(NOT P) OR (NOT Q)

In other words, NOR and NAND logic functions can be implemented using AND, OR and NOT gates. As another consequence of the laws of logic, a XNOR function can is be implemented using AND, OR and NOT gates:

P XNOR Q=(P AND Q) OR ((NOT P) AND (NOT Q)).

Figure 9A:
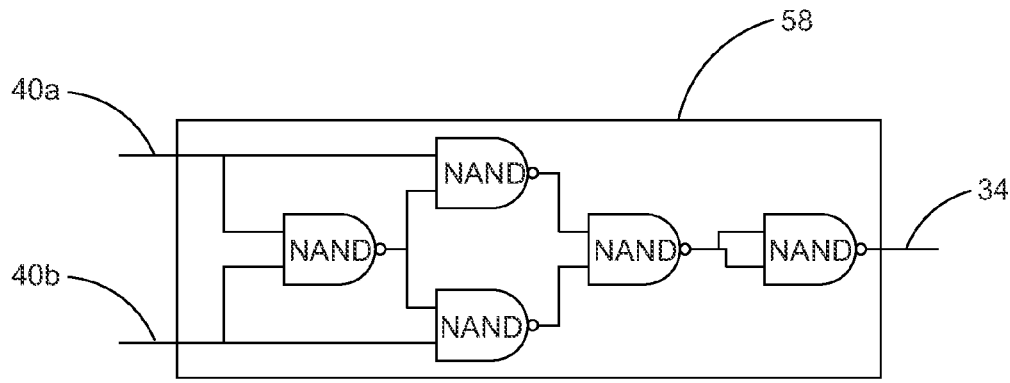
FIGS. 9A to 9C are schematic representations of examples of implementation of logic gate modules.

Alternatively, De Morgan's laws state that XNOR can be implemented with NAND gates, as shown in FIG. 9A, or NOR gates. In general, any possible logic function can be expressed as a combination of so called functionally complete sets of logic gates implementing basic logic rules. Known examples of functionally complete sets of logic gates are, for example: a NAND gate alone, a NOR gate alone, a set of AND and NOT gates, a set of OR and NOT gates, and any combinations of these sets.

Figure 9B:
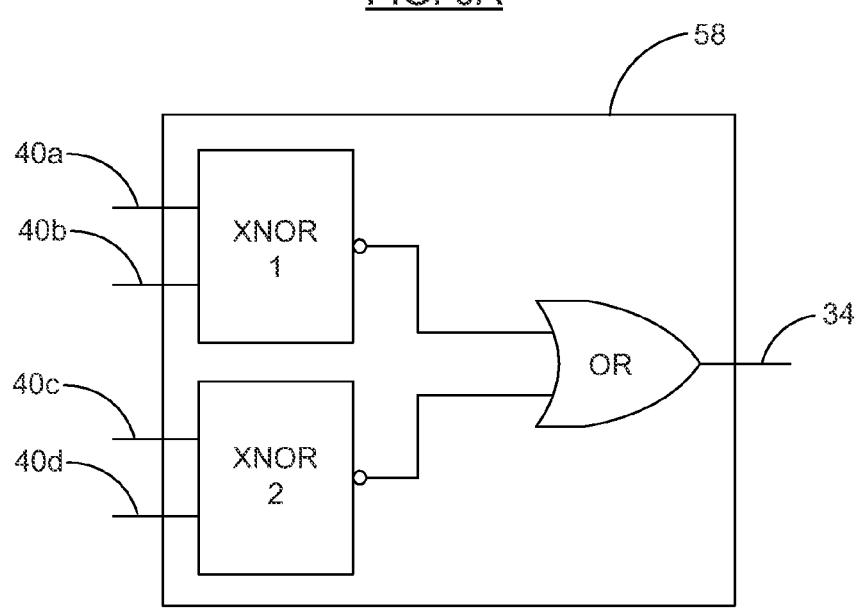

In putting to practice the embodiment illustrated in FIG. 2 using currently available components, the minimum burst sub-pulse period ($T_B$ in FIG. 1) is only limited by the minimum duration and interpulse period of the logic sequence that can be generated by the control circuit 36. In an embodiment of this invention, the control circuit 36 can be implemented in a FPGA that can produce programmable logic sequences composed by pulses with typical minimum duration of 1 ns and minimum interpulse period of 1 ns. This give a minimum burst sub-pulse period $T_B$ of 2 ns, corresponding to a sub-pulse repetition rate of 500 MHz. However, if a more complex logic function is implemented, the repetition rate can be increased. Therefore, in some embodiments of the invention the logic module may include a plurality of logic gates, each imposing a corresponding logical rule, such that the combined logical rules provide an equivalent logical function. For example, referring to FIG. 9A, the logic gate module 58 implements a XNOR equivalent logical function using an arrangement of NOT and AND gates, or equivalently using an arrangement of NAND gates. A XNOR gate is also available as integrated circuit, such as for example model 50710XR from INPHI (tradename). A XNOR logic rule doubles the sub-pulse repetition rate with respect to an AND gate, providing $T_B$=1 ns. Further doubling of the repetition rate (to reach $T_B$=500 ps) could be obtained using more than two logic sequences with an appropriate relative delay. For example, FIG. 9B shows a logic gating module made of two XNOR and one OR gates. Other logic functions can be used with similar results, and further increasing the number if logic sequences could allow further decrease of $T_B$ below 500 ps.

Figure 9C:
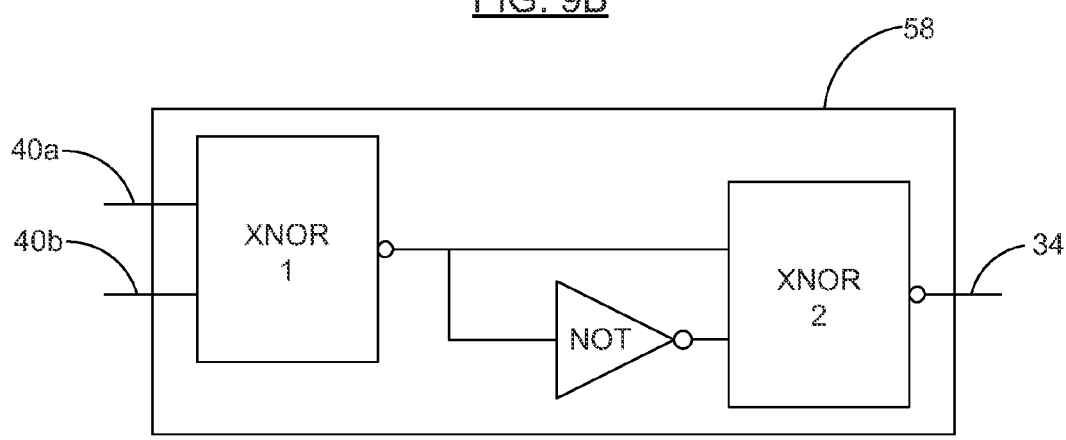

The sub-pulse repetition rate can also be increased by taking advantage of the propagation delay of a logic gate, i.e. the time it takes to have a valid output once the input is set. For example, an Inphi 50713OR gate can implement a NOT function with a typical signal propagation delay of 200 ps. This fixed and not programmable delay can be exploited to produce burst with minimum sub-pulse period of 200 ps. An appropriate architecture for such a logic gate module is shown in FIG. 9C.

The output of the logic gate module 58 therefore provides the modulator drive signal 34, which defines a succession of ON states and OFF states determined by the ON and OFF states of the logic signals 40, the adjusted relative timing relationship of the logic signals 40 and the logical rule or rules implemented by the logic gate module 58. The logic gate module 58 is connected to the amplitude modulator 28 for driving this modulator 28 using the modulator drive signal 34.

Figure 6:
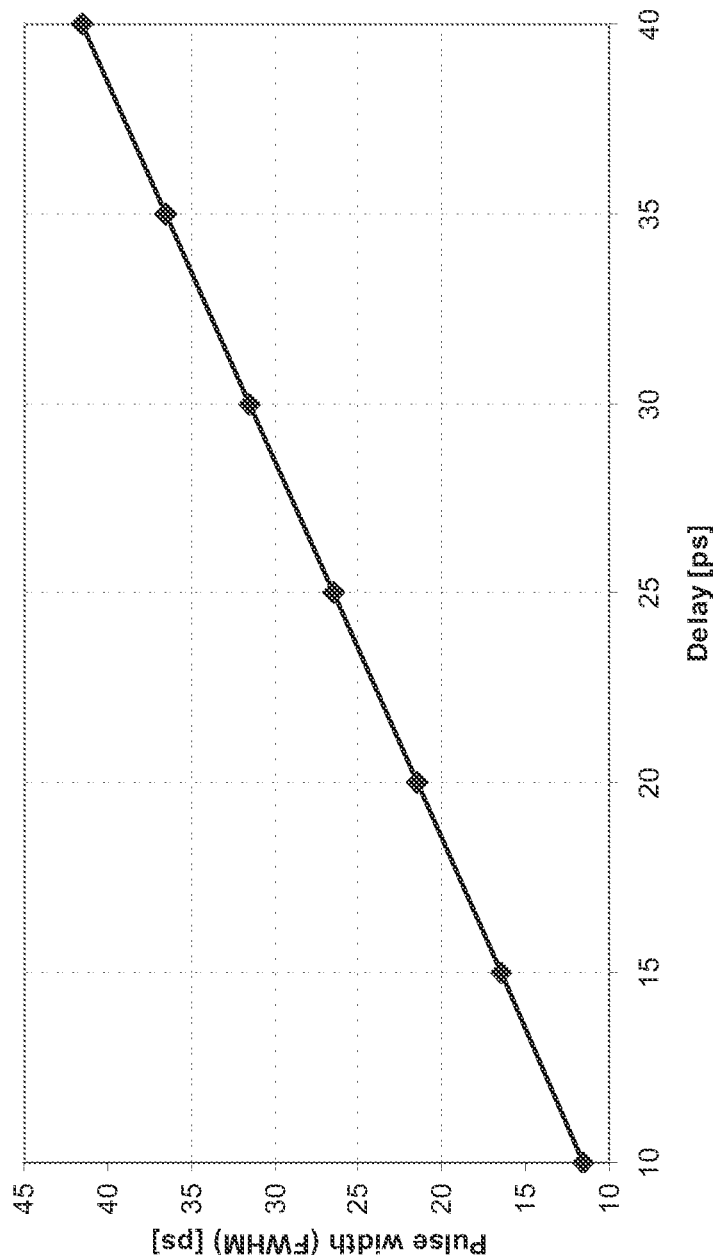
FIG. 6 is a graph showing results of simulated output pulse width as a function of the relative delay between two logic signals.
Figure 7:
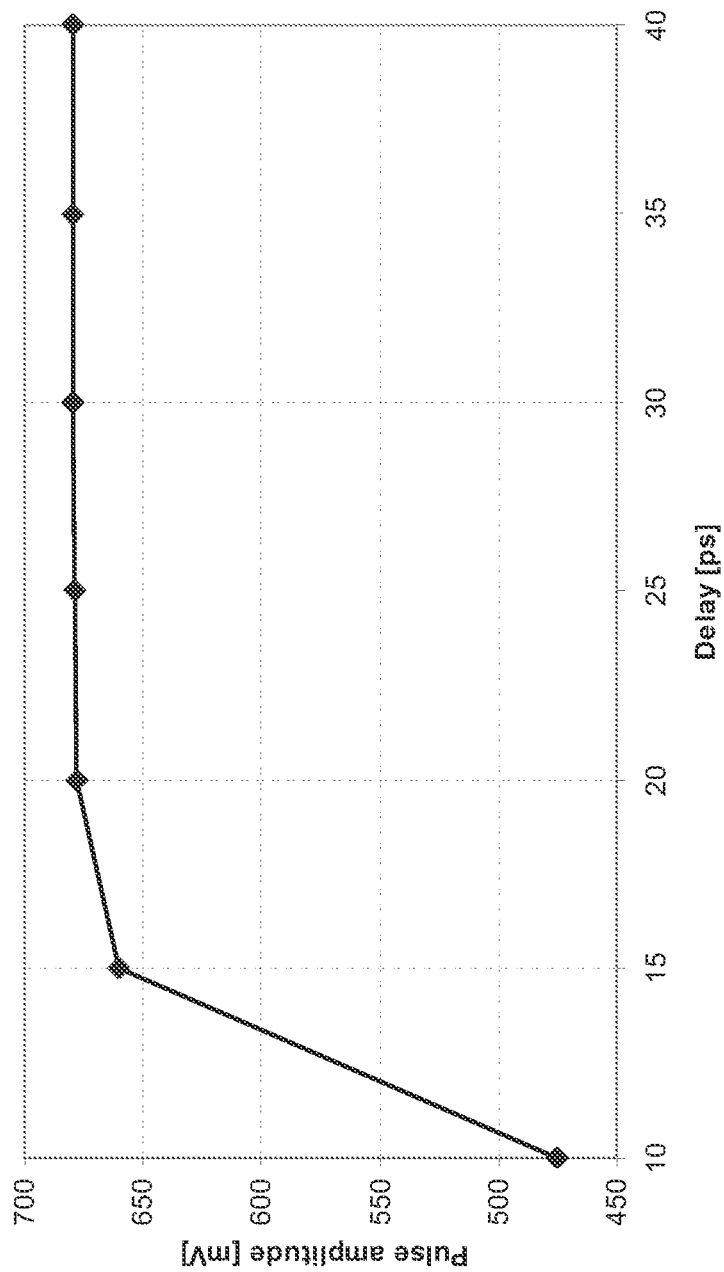
FIG. 7 is a graph showing results of simulated pulse amplitude at the modulator driver input as a function of the relative delay between two logic signals.

One skilled in the art will readily understand that the precision and tolerance of components of systems and circuit assemblies embodying the invention may have a slight influence on the shape of the various signals generated thereby. To illustrate this point, FIG. 6 and FIG. 7 respectively show the expected pulse width and pulse amplitude in an example where a commercial 50 GHz AND logic gate embodies the logic gate module, as a function of the adjusted relative timing relationship of the logic signals, i.e. the relative delay therebetween at the input of the logic gate. In this example, both logic signals are 1 ns long, and one is delayed relative to the other by the amount of time given in the horizontal axis. In FIG. 6 the vertical axis describes the output pulse width at FWHM, embodying the modulator drive signal. The resulting pulse is slightly longer than the delay between the input pulses, giving a 12 ps pulse for a 10 ps delay. In FIG. 7, the vertical axis describes the simulated amplitude of pulses of the modulator drive signal, which is above 400 mV for delay values as low as 10 ps. The actual optical pulse duration at the laser output can also be affected by the amplitude modulator and the amplitude modulator driver bandwidths but, if high speed components are chosen, optical pulses having duration very similar to the pulses of the modulator drive signal are obtained. One skilled in the art will know to take such factors under consideration to obtain output pulses having desired characteristics in view of the particularities of the devices used in a given system embodying the invention.

Additional components for conditioning or adapting the modulator drive signal 34 to the particular characteristics of the amplitude modulator 28 may optionally be provided. In the illustrated embodiment of FIG. 2, a modulator driver 62 is provided to amplify and condition the modulator drive signal 34, so that ON and OFF logic voltage levels at the output of the logic gate module 58 are mapped onto fully open and fully closed states of the amplitude modulator 28. Typically, less than 8 V of voltage swing are sufficient to switch the state of the amplitude modulator 28. Amplitude modulator drivers on the market are available with less than 10 ps output rise time, 7.5 V-8 V output voltage swing and working with 400 mV input single ended voltage swing. Examples of appropriate devices include model 4311 DZ from INPHI (corporate name), and model OA4MVM3 from Centellax (corporate name). Also optionally, an amplitude modulator bias control circuit 29 may be used to keep the amplitude modulator biased in such a way that ON and OFF logic voltage levels at the output of the logic gate are properly mapped onto fully open and fully closed states of the amplitude modulator 28.

As one skilled in the art will readily understand, the laser system 24 controlled in the fashion described above will output one optical pulse at each ON state of the modulator drive signal 34 synchronized with the passage of one of the seed optical pulses 38 from the seed laser source 26 through the amplitude modulator 28. The number and versatility of the parameters which can be controlled to provide the desired output result in a very adaptable platform, which can be easily adapted to user specifications. In one example application, the seed drive signal and modulator drive signal could each define pulses of characteristic pulsewidth and repetition rate selected so that the modulator drive signal defines a plurality of sub-pulses within one pulse of the seed drive signal—in effect providing bursts of optical pulses or sub-pulses.

Embodiments of a method for producing optical pulses and examples of results which may be obtained using such a method and a laser system according to an embodiment of the invention are described below.

Figure 10:
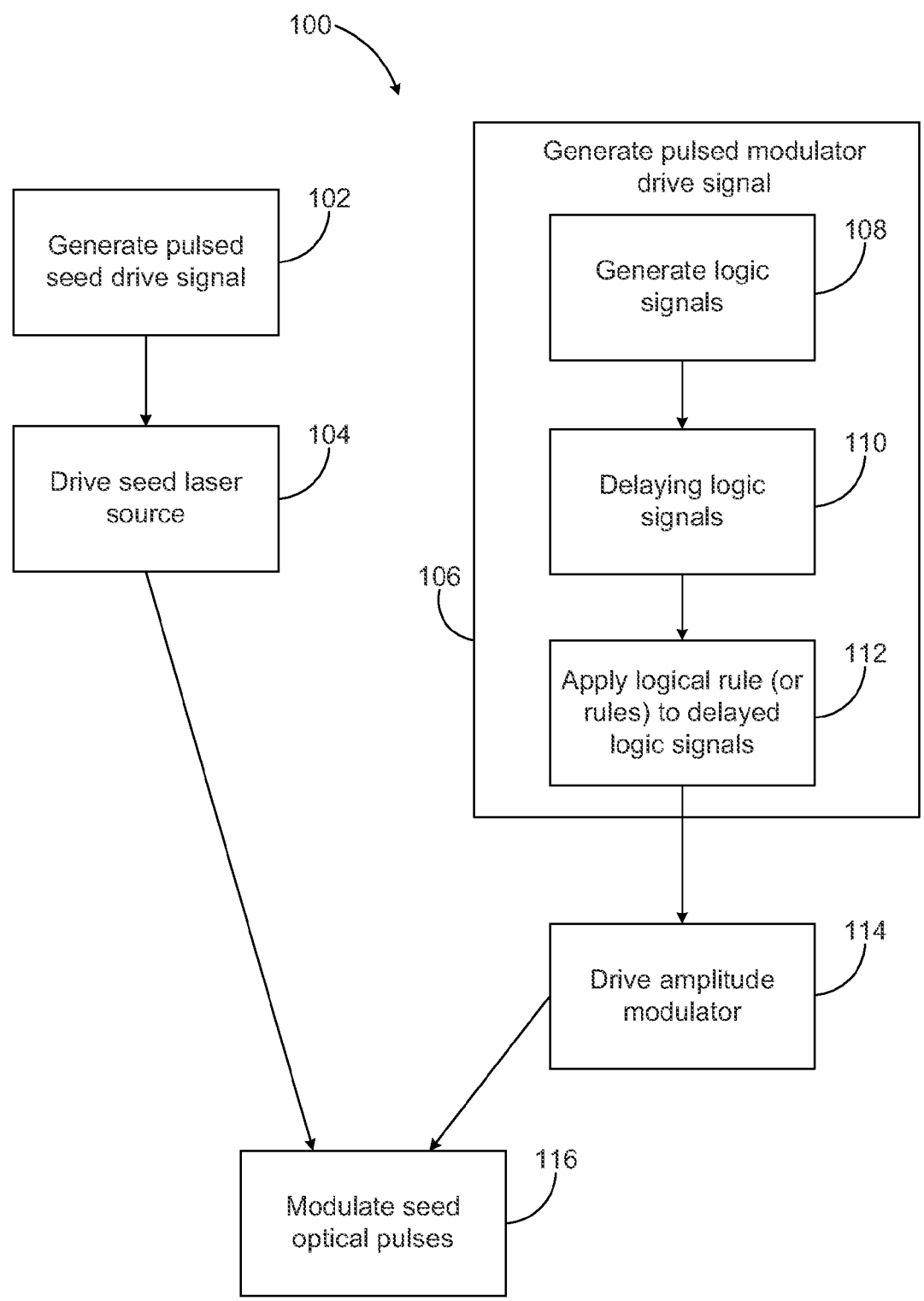
FIG. 10 is a flow chart of a method for generating optical pulses according to one embodiment of the invention.

Method and Examples of the Generation of Optical Pulses Using Embodiments of the Invention In accordance with another aspect of the invention, there is provided a method 100 for outputting optical pulses. With reference to FIG. 10, a flow chart of an embodiment of such a method, using a laser system such as described above, is shown.

The method 100 first includes a step of generating a pulsed seed drive signal 102. The amplitude profile of the seed drive signal may be controlled. Preferably, the seed drive signal defines pulses having a characteristic pulsewidth between about 1 ns and 100 ns.

The next step of the method 100 includes driving a seed laser source 104 with the seed drive signal to generate seed optical pulses.

The method 100 next involves generating a pulsed modulator drive signal 106 in coordination with the seed drive signal. For this purpose, a plurality of logic signals is first generated 108. Each logic signal defines a succession of ON and OFF states, and the logic signals have a predetermined relative timing relationship. In one embodiment, this may be accomplished by outputting, for each logic signals, an electrical pulse corresponding to the ON or the OFF state, the other one of the ON and OFF states corresponding to an interpulse period between the electrical pulses. At least one of the logic signals is then delayed 110, to adjust the relative timing relationship between the logic signals. The delaying may be performed dynamically, that is, controlled on the time scale of the interpulse period between seed optical pulses, to modify the relative timing relationship between consecutive optical pulses. The logic signals are then combined according to at least one logical rule 112, thereby providing the modulator drive signal. The modulator drive signal defines a succession of ON states and OFF states which are determined by the ON and OFF states of the logic signals, the adjusted relative timing relationship of the logic signals and logical rule or rules applied.

The method 100 further includes a step of driving an amplitude modulator optically coupled to the seed light source using said modulator drive signal 114.

As a result of the steps defined above, the modulator modulates the seed optical pulses 116 to output the optical pulses at each ON state of the modulator drive signal synchronized with the passage of one of the seed optical pulses through the amplitude modulator.

In one embodiment, only two of logic signals are generated and the logical rule is embodied by an AND gating rule. In such a case, each ON state of the modulator drive signal is provided by the partial synchronization of respective ON states of the logic signals.

In some embodiments of the invention, the seed drive signal and the modulator drive signal may each define pulses of characteristic pulsewidth and repetition rate selected so that the modulator drive signal defines a plurality of sub-pulses within one pulse of the seed drive signal, thereby providing bursts of optical pulses.

The principle of operation of the laser system described above to obtain optical pulses is described in more detail below in the context of several examples, given for illustrative purposes only.

Figure 3:
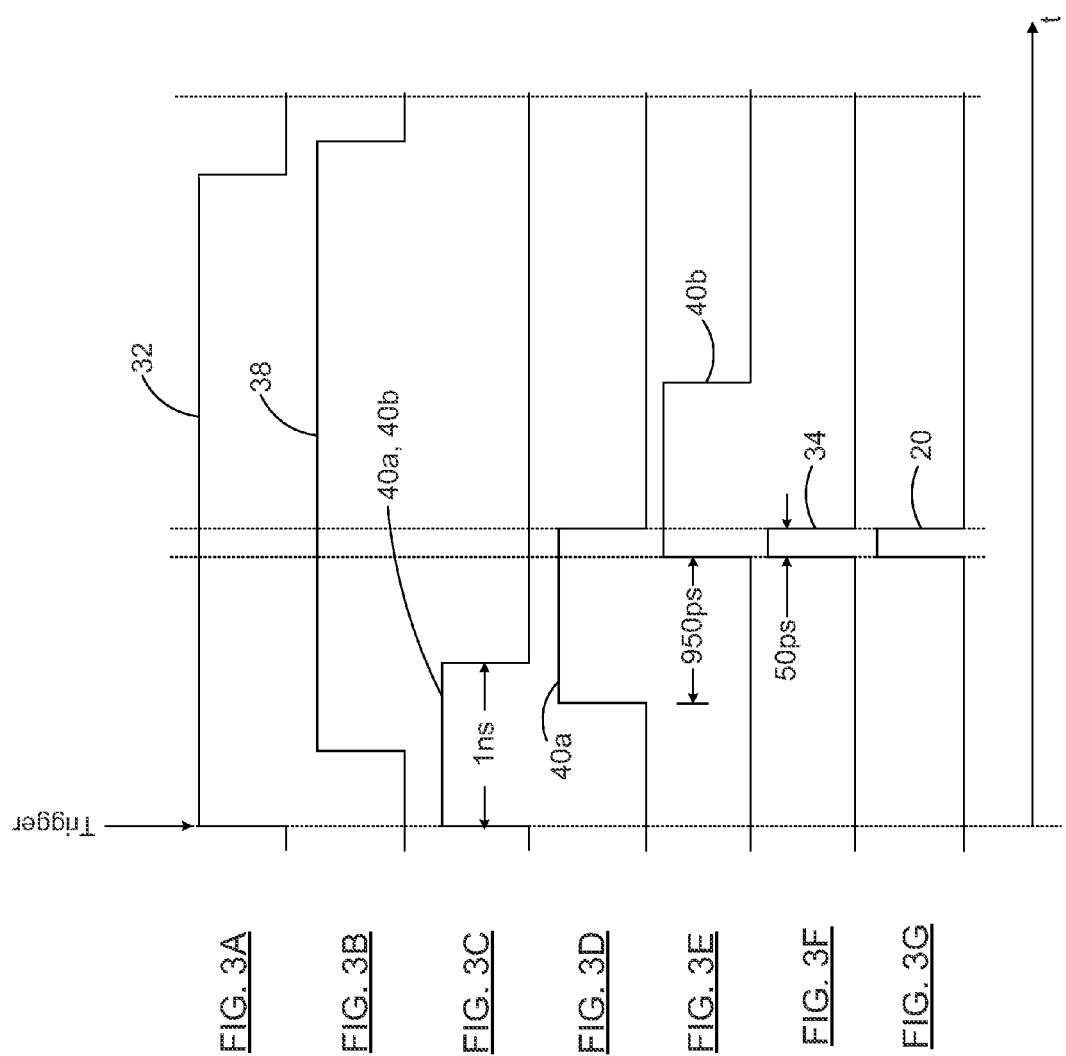
FIGS. 3A to 3G show timing diagrams for the signals involved in the generation of a single picosecond pulse carved in a flat top seed pulse, according to one example of an embodiment of the invention.
Figure 4:
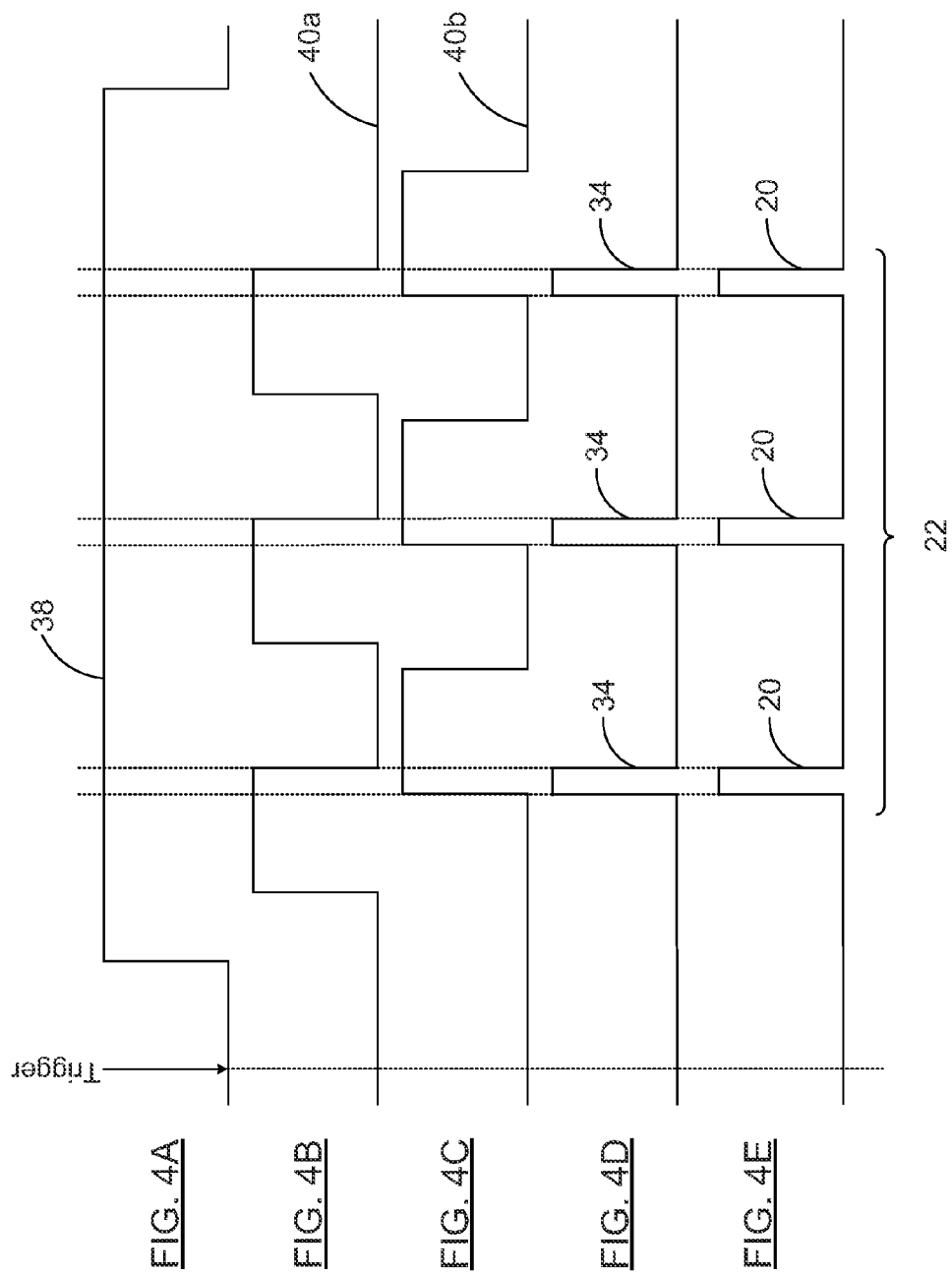
FIGS. 4A to 4E show timing diagrams for the signals involved in the generation of a picosecond pulse burst carved in a flat top seed pulse.
Figure 5:
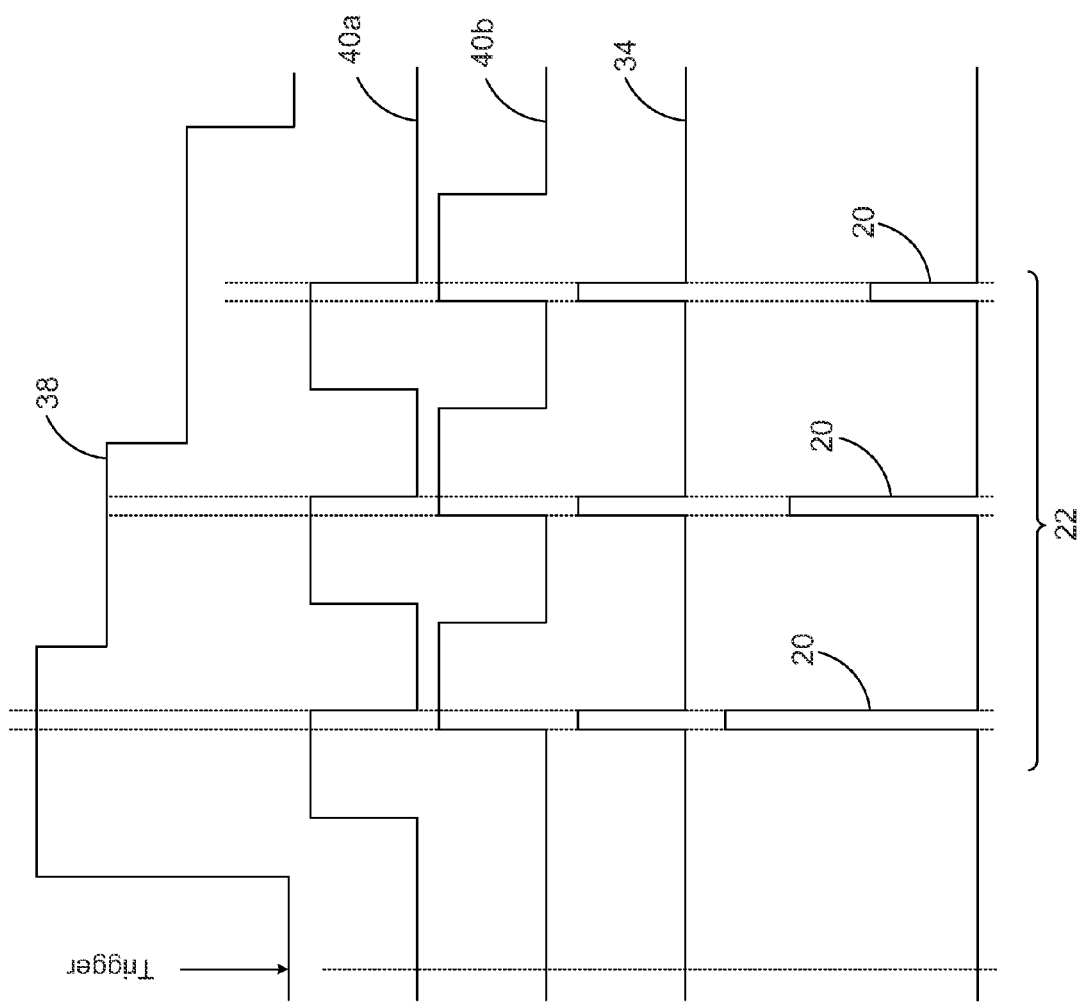
FIGS. 5A to 5E show timing diagrams for the signals involved in the generation of a picosecond pulse burst carved in an amplitude tailored seed pulse.

Referring to FIGS. 3A to 3G, timing diagrams are shown, using the generation of a single picosecond pulse as the output pulse as an example. When the trigger is received by the control circuit, a seed laser drive signal 32 is generated (FIG. 3A) with a flat top shape and amplitude determined by the control circuit. The seed laser, driven by the seed drive signal 32, emits a seed optical pulse 38 (FIG. 3B) with shape and duration determined by the seed laser drive signal 32. Parallely, the trigger causes the control circuit to generate two pulse logic signals 40a, 40b, shown in FIG. 3C synchronous at the time of their generation by the control circuit, for example having a duration of 1 ns duration. In the illustrated example, an AND logic gate is assumed, and the two logic signals encode an ON logic state with a high voltage level and an OFF logic state with a low voltage level. FIGS. 3D and 3E respectively show the two logic signals 40a and 40b after they have been delayed by the corresponding delay lines, assuming, by way of example, a relative delay of 950 ps resulting from the programming of the two delay lines. As shown in FIG. 3F (not to scale), the resulting output of the AND logic port, embodying the modulator drive signal 34 is ON (high voltage level) during only 50 ps, that is the period of time where both the delayed logic signals are ON. The amplitude modulator driver amplifies this pulse in order to switch the amplitude modulator to an open state for 50 ps. In this example, the timing between the seed laser pulse and the amplitude modulator open time window is controlled so that a 50 ps optical pulse 20 is produced (FIG. 3G).

In FIGS. 4A to 4E, an example of generation of a burst of pulses is illustrated. In this example, an AND logic gate is again assumed, and the two logic signals 40a and 40b encode the same logic sequence, with a high voltage level representing an ON logic state and a low voltage level representing an OFF logic state. Hence, the output of the AND logic port is ON (high voltage level) during the periods of time where both the logic signals are ON. However, when compared to the previous example, the logic signals 40a and 40b encode a more complex logic sequence, with multiple ON and OFF states, each with 1 ns duration (that is: $T_B$=2 ns, corresponding to 500 MHz pulse repetition rate). The seed optical pulse 38 is again flat top and has a duration at least as long as the desired burst duration. As described before, a 950 ps relative delay is imposed on the two logic signals 40a and 40b so that the AND port generate 50 ps pulses (note that still $T_B$=2 ns). Hence, the seed optical pulse 38 is modulated by the optical amplitude modulator to produce a burst 22 of 50 ps pulses 20.

In FIGS. 5A to 5E, another example of the generation of a 22 burst of optical pulses 20 with tailored pulse amplitude along the burst is shown. Again, the logic signals 40a and 40b encode a complex logic sequence, with multiple ON and OFF states, each with 1 ns duration (that is: $T_B$=2 ns, corresponding to 500 MHz pulse repetition rate). The seed optical pulse 38 is driven by the control circuit in order to have a complex amplitude shape. A 950 ps relative delay is imposed on the two logic signals 40a and 40b so that the AND port generate 50 ps pulses (note that still $T_B$=2 ns). Hence, the seed optical pulse 38 is modulated by the optical modulator drive signal 34 to produce a burst 22 of 50 ps pulses 20. The amplitude of each optical pulse 20 in the burst 22 is defined by the amplitude of the seed optical pulse 38 when the modulator is open to generate that particular pulse 20.

As mentioned above, other logical rules than a simple AND gate can also be considered. Referring to FIGS. 11A to 11D, there is illustrated an example of the generation of the modulator drive signal 34 using a logic gate module resulting in an XNOR output such as shown in FIG. 9A. As one skilled in the art will readily understand, an XNOR logic rule will yield an ON state if both inputs are the same, i.e. if the logic signals 40a (FIG. 11A) and 40b (FIG. 11B) at the logic gating module are both in an ON state or both in an OFF state, and yield an OFF state otherwise. In the illustrated example, when compared with the output of an AND gate shown in FIG. 11C for comparison, the repetition rate of the pulses 20 defining the modulator drive signal 34 outputted by the XNOR gate (FIG. 11D) is doubled.

FIGS. 12A through 12G illustrate the timing of the signals involved in the generation of the modulator drive signal using the logic gate module 58 shown in FIG. 9B. In this case, four logic signals 40a, 40b, 40c and 40d (see FIGS. 12A to 12D) are provided at the input of the logic gate module. Two pairs 40a,40b and 40c,40d of these logic signals are combined by separate XNOR gates, providing transitional signals 98a (FIG. 12E) and 98b (FIG. 12F). These transitional signals 98a, 98b are then combined by an OR gate, providing the modulator drive signal 34. As can be seen, increasing the number of logic sequences can therefore be used to decrease the duration of a pulse or sub-pulse.

Referring to yet another example, FIGS. 13A to 13E show the combination of two logic signals 40a (FIG. 13A) and 40b (FIG. 13B) in a gating module 58 such as shown in FIG. 9C. The two logic signals 40a, 40b are first combined by a first XNOR gate, obtaining a first transitional signal 98a. The first transitional signal 98a is divided into two branch, one of which is transformed by a NOT gate, providing a second transitional signal 98b. Both transitional signals 98a and 98b are finally combined by a second XNOR gate, providing the final modulator drive signal 34.

It is to be noted that, in the three last examples above, the final obtained optical pulses can be further adapted to differ from the modulator drive signal through an appropriate shaping of the seed drive pulses and the timing of these seed pulses through the amplitude modulator.

Of course, numerous modifications could be made to the embodiments above without departing from the scope of the present invention as defined in the appended claims.

The invention claimed is:

1. A circuit assembly for controlling an optical system to generate optical pulses, the optical system comprising a seed light source optically coupled to an amplitude modulator, the circuit assembly comprising:

a control circuit for generating a pulsed seed drive signal for driving the seed light source, the control circuit further generating a plurality of logic signals in coordination with the seed drive signal, said logic signals each defining a succession of ON and OFF states and having a predetermined relative timing relationship;

at least one programmable delay line, each of said at least one delay line receiving one of the logic signals for delaying said one of the logic signals to adjust said relative timing relationship;

a logic gating module for combining said logic signals according to at least one logical rule, thereby providing a modulator drive signal for driving said amplitude modulator, said modulator drive signal defining a succession of ON states and OFF states determined by the ON and OFF states of the logic signals, the adjusted relative timing relationship of the logic signals and said at least one logical rule;

whereby said optical system outputs one of said optical pulses at each ON state of the modulator drive signal synchronized with the passage of one of said seed optical pulses through the amplitude modulator.

2. The circuit assembly according to claim 1, wherein the seed drive signal generated by the control circuit has a user-defined amplitude profile.

3. The circuit assembly according to claim 1, wherein, for each one of said logic signals, one of the ON and OFF states corresponds to the outputting of an electrical pulse by the control circuit, and the other one of said ON and OFF states corresponds to an interpulse period between said electrical pulses.

4. The control circuit according to claim 1, wherein the at least one programmable delay line comprises a corresponding one of said programmable delay lines for each of said logic signals.

5. The circuit assembly according to claim 1, wherein the plurality of logic signals comprises only two of said logic signals.

6. The circuit assembly according to claim 1, wherein the control circuit comprises a pulse shape generator generating the seed drive signal and a logic signal pulse generator generating the plurality of logic signals.

7. The circuit assembly according to claim 1, wherein the logic gating module is an AND logic gate.

8. The circuit assembly according to claim 1, wherein the logic gating module comprises a plurality of logics gates each imposing one of said logical rules.

9. The circuit assembly according to claim 1, wherein the logic gating module is an XNOR logic gate.

10. The circuit assembly according to claim 1, wherein the logic gating module comprises:
a first XNOR logic gate combining said logic signals to obtain a first transitional signal;
a signal splitter splitting the first transitional signal into a pair of components thereof;
a NOT logic gate in a path of one of said components, providing a second transitional signal; and
a second XNOR logic gate combining said first and second transitional signals.

11. The circuit assembly according to claim 1, wherein the seed drive signal and modulator drive signal each define pulses of characteristic pulsewidth and repetition rate selected so that the modulator drive signal defines a plurality of sub-pulses within one pulse of the seed drive signal, thereby providing bursts of said optical pulses.

12. The circuit assembly according to claim 1, wherein the control circuit has a trigger input for receiving a logic trigger signal for triggering the generating of the seed driving signal and the plurality of logic signals by the control circuit.

13. The circuit assembly according to claim 1, wherein the control circuit has one or more user inputs for receiving user defined parameters from a user interface, said user defined parameters comprising at least one of said predetermined timing relationship of the logic signals, a delay for programming in said at least one programmable delay line and an amplitude of said seed drive signal.

14. An optical system for generating optical pulses, comprising:
a seed light source;
an amplitude modulator optically coupled to the seed light source; and
a circuit assembly controlling the seed light source and amplitude modulator, said circuit assembly comprising:
a control circuit generating a pulsed seed drive signal and being connected to the seed light source for driving said seed light source with the seed drive signal to generate seed optical pulses, the control circuit further generating a plurality of logic signals, said logic signals each defining a succession of ON and OFF states and having a predetermined relative timing relationship;
at least one programmable delay line, each of said at least one delay line receiving one of the logic signals for delaying said one of the logic signals to adjust said relative timing relationship;
a logic gating module for combining said logic signals according to at least one logical rule, thereby providing a modulator drive signal, said modulator drive signal defining a succession of ON states and OFF states determined by the ON and OFF states of the logic signals, the adjusted relative timing relationship of the logic signals and said at least one logical rule, said logic gate module being connected to the amplitude modulator for driving said amplitude modulator using the modulator drive signal,
whereby said optical system outputs one of said optical pulses at each ON state of the modulator drive signal synchronized with the passage of one of said seed optical pulses through the amplitude modulator.

15. The optical system according to claim 14, wherein the seed light source is a semiconductor laser diode, a Q-switched solid state laser, a pulsed fiber laser or a light-emitting diode.

16. The optical system according to claim 14, wherein the amplitude modulator is an electro-optical modulator or an electro-absorption modulator.

17. The optical system according to claim 14, wherein the seed drive signal generated by the control circuit has a user-defined amplitude profile.

18. The optical system according to claim 14, wherein the at least one programmable delay line comprises a corresponding one of said programmable delay lines associated with each of said logic signals.

19. The optical system according to claim 14, wherein the logic gating module is an AND logic gate.

20. The optical system according to claim 14, wherein the logic gate module comprises a plurality of logics gates each imposing one of said logical rules.

21. The optical system according to claim 14, wherein the logic gating module is an XNOR logic gate.

22. The optical system according to claim 14, wherein the logic gating module comprises:
a first XNOR logic gate combining said logic signals to obtain a first transitional signal;
a signal splitter splitting the first transitional signal into a pair of components thereof;
a NOT logic gate in a path of one of said components, providing a second transitional signal; and
a second XNOR logic gate combining said first and second transitional signals.

23. The optical system according to claim 14, wherein the seed drive signal and modulator drive signal each have pulses of characteristic pulsewidth and repetition rate selected so that the modulator drive signal defines a plurality of sub-pulses within one pulse of the seed drive signal, thereby providing bursts of said optical pulses.

24. The optical system according to claim 14, further comprising a triggering circuit generating a logic trigger signal and connected to the control circuit for providing said logic trigger signal thereto, the generating of the seed driving signal and of the plurality of logic signals being triggered by said logic trigger signal.

25. The optical system according to claim 24, wherein the triggering circuit receives as input a clock reference signal and a user trigger signal.

26. The optical system according to claim 25, wherein the triggering circuit further generates an auxiliary trigger signal.

27. The optical system according to claim 14, further comprising a modulator driver receiving the modulator drive signal from the logic gating module and conditioning the same for use with said amplitude modulator.

28. The optical system according to claim 14, further comprising a user interface connected to the control circuit for providing user defined parameters thereto, said user defined parameter comprising at least one of said predetermined timing relationship of the logic signals, a delay for programming in said at least one programmable delay line and an amplitude profile of said seed drive signal.

29. A method for outputting optical pulses, comprising:
   a) generating a pulsed seed drive signal;
   b) driving a seed light source with the seed drive signal to generate seed optical pulses;
   c) generating a pulsed modulator drive signal in coordination with the seed drive signal, said generating of the modulator drive signal comprising the substeps of:
      i. generating a plurality of logic signals each defining a succession of ON and OFF states, said logic signals having a predetermined relative timing relationship;
      ii. delaying at least one of the logic signals to adjust said relative timing relationship; and
      iii. combining said logic signals according to at least one logical rule, thereby providing the modulator drive signal, said modulator drive signal defining a succession of ON states and OFF states determined by the ON and OFF states of the logic signals, the adjusted relative timing relationship of the logic signals and said at least one logical rule; and
   d) driving an amplitude modulator optically coupled to said seed light source using said modulator drive signal; whereby said optical pulses are outputted at each ON state of the modulator drive signal synchronized with the passage of one of said seed optical pulses through the amplitude modulator.

30. The method according to claim 29, wherein step a) comprises controlling an amplitude profile of said seed drive signal.

31. The method according to claim 29, wherein the generating a plurality of logic signals of step c)i comprises outputting, for each one of said logic signals, an electrical pulse corresponding to one of said ON and OFF states thereof, the other one of said ON and OFF states corresponding to an interpulse period between said electrical pulses.

32. The method according to claim 29, wherein the at least one logical rules is an AND gating rule.

33. The method according to claim 29, wherein the at least one logical rules is a plurality of logical rules resulting in an equivalent logical output.

34. The method according to claim 33, wherein said equivalent logical output is an XNOR rule.

35. The method according to claim 29, wherein the seed drive signal and the modulator drive signal each define pulses of characteristic pulsewidth and repetition rate selected so that the modulator drive signal defines a plurality of subpulses within one pulse of the seed drive signal, thereby providing bursts of said optical pulses.

36. The method according to claim 29, wherein the seed drive signal defines pulses having a characteristic pulsewidth between about 1 ns and 100 ns.

37. The method according to claim 36, wherein the modulator drive signal defines pulses having a characteristic pulsewidth between about 10 picoseconds and 5 nanoseconds.

38. The method according to claim 29, wherein the delaying of step c)ii is performed dynamically to modify said relative timing relationship during an interpulse period between consecutive ones of said optical pulses.

* * * * *